(12) United States Patent
Hueber et al.

(10) Patent No.: US 10,574,303 B1
(45) Date of Patent: Feb. 25, 2020

(54) SYSTEM AND METHOD TO TEST AND CALIBRATE CARD-DETECTION USING ACTIVE TAG EMULATION

(71) Applicant: NXP B.V., Eindhoven (NL)

(72) Inventors: Gernot Hueber, Linz (AT); Ian Thomas Macnamara, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/236,306

(22) Filed: Dec. 28, 2018

(51) Int. Cl.
*H04B 5/00* (2006.01)
(52) U.S. Cl.
CPC .................. *H04B 5/0075* (2013.01)
(58) Field of Classification Search
CPC .................................................. H04B 5/0075
See application file for complete search history.

(56) References Cited

U.S. PATENT DOCUMENTS

| | | | | |
|---|---|---|---|---|
| 2004/0252715 A1* | 12/2004 | Noda | .................... | H04W 28/18 370/444 |
| 2009/0243397 A1* | 10/2009 | Cook | ...................... | H02J 5/005 307/104 |
| 2010/0248625 A1* | 9/2010 | Washiro | .................. | H01Q 1/007 455/41.1 |
| 2014/0003548 A1* | 1/2014 | Lefley | .................... | H04B 5/0075 375/268 |
| 2015/0130480 A1* | 5/2015 | Berkcan | .................... | H04Q 9/00 324/633 |
| 2016/0328584 A1* | 11/2016 | Rokhsaz | ................ | H01Q 5/335 |
| 2019/0149196 A1* | 5/2019 | Hueber | ................ | H04B 5/0043 340/10.1 |

OTHER PUBLICATIONS

AN11482 "PN547 Antenna Self Test" Rev. 1.0; Application Note, NXP Semiconductors; Nov. 21, 2013.

* cited by examiner

*Primary Examiner* — Md K Talukder

(57) ABSTRACT

This specification discloses methods and devices for emulating a tag device that communicates via inductive coupling, such as a NFC (Near Field Communication) tag device. In some embodiments, this specification discloses methods and devices to use this tag device "emulation" for testing, validating, calibrating, and characterizing a reader device. In some embodiments, a tag emulation device can emulate movement of the tag emulation device relative to the reader device by changing configuration parameters of the tag emulation device and by not actually moving the tag emulation device relative to the reader device. In some embodiments, these configuration parameters changes include: changing a Tx (transmitter) voltage, changing a Tx driver impedance, changing a HF (high frequency) attenuator resistance, changing a Tx output modulation, changing a matching network tuning, changing a phase of a Tx signal versus a carrier signal from the reader device, enabling one or two Tx drivers.

20 Claims, 6 Drawing Sheets

SYSTEM AND METHOD TO TEST AND CALIBRATE CARD-DETECTION USING ACTIVE TAG EMULATION

FIELD

The described embodiments relate generally to systems and methods for emulating a device that communicates via inductive coupling, and more particularly to systems and methods for emulating a tag device that communicates via inductive coupling for testing and calibrating card-detection features.

BACKGROUND

A NFC (Near Field Communication) enabled device is an example of a communications device that communicates via inductive coupling. NFC is a short-range wireless technology that allows communication between NFC enabled objects over a distance of less than 10 cm. NFC is based on Radio Frequency Identification (RFID) standards. It is a technology that is designed to make an easier and more convenient world for us, enhancing the way we make transactions, exchange content and connect devices.

As an example, the NFC communication protocols can be used by two electronic devices, one of which is usually a portable device such as a smartphone, to establish communication by bringing themselves close to each other. As further examples, NFC-enabled devices can be used in contactless payment systems, social networking (for sharing contacts, photos, videos or files), electronic identity documents and keycards. NFC can also offer a low-speed connection with simple setup that can be used to activate more capable wireless connections.

In some use cases, a NFC reader can be used to read a NFC tag. These NFC tags, in turn, can be used for these purposes: product identification, asset tagging, product authentication, object identification, Bluetooth pairing with NFC, product located consumable re-ordering tags (PLCR tags), product authentication, access control, etc.

For these NFC reader/tag systems (or, in general, any RF (radio frequency) reader/tag systems), as an example, it is an important feature for a reader device to be able to detect a target device (e.g., tag device) within communication distance.

Therefore, because a RF reader/tag system is so useful and important, there is a need for efficient mass production and testing of the RF reader/tag system. In particular, there are strong needs for systems and methods that can support more efficient and cost-effective testing and calibrating of card-detection features for a RF reader/tag system.

SUMMARY

This specification discloses methods and devices for emulating a tag device that communicates via inductive coupling, such as a NFC (Near Field Communication) tag device. In some embodiments, this specification discloses methods and devices to use this tag device "emulation" for testing, validating, calibrating, and characterizing a reader device.

As an example, it is an important feature for a reader device to be able to detect that a tag device is within communication distance. One obvious way to perform this test would be to use and move a tag device (or a card device) from a far-distance to be closer to the DUT (device under test) until the tag/card device is detected by, for example, (a) being able to execute a transaction, or (b) detecting the detuning (change of load) "seen" by the reader device. Regardless of the technique used, during a production test, the part-to-part accuracy needs to be quantified with one or multiple reference tag devices. However, moving or swapping the tag/card device is not fast, accurate, repeatable, or cost-effective. Therefore, there are strong motivations to use a "emulation" tag device to emulate moving (or swapping) the tag device, without actually moving (or swapping) the tag device. Accordingly, in some embodiments, a tag emulation device can emulate movement of the tag emulation device relative to the reader device by changing configuration parameters of the tag emulation device and by not actually moving the tag emulation device relative to the reader device. Furthermore, movement of the tag emulation device relative to the reader device can be considered to be a "coupling change" of the tag emulation device relative to the reader device. Therefore, in general, a tag emulation device can emulate "coupling change" of the tag emulation device relative to the reader device by changing configuration parameters of the tag emulation device and by not actually moving the tag emulation device relative to the reader device. In some embodiments, the coupling change can correspond to movement of the tag emulation device relative to the reader device. In other embodiments, the coupling change can also correspond to changing one of the following: (i) a position of the tag emulation device relative to the reader device, (ii) an orientation of the tag emulation device relative to the reader device, (iii) an antenna size of the tag emulation device and/or an antenna size of the reader device.

In some embodiments, a tag emulation device can emulate movement of (or "coupling change" of) the tag emulation device relative to the reader device by changing one or more of the following configuration parameters of the tag emulation device: (1) changing a Tx (transmitter) voltage, (2) changing a Tx driver impedance, (3) changing a HF (high frequency) attenuator resistance, (4) changing a Tx output modulation, (5) changing a matching network tuning, (6) changing a phase of a Tx signal versus a carrier signal of the transmitted field from the reader device, (7) enabling one or two Tx drivers. In turn, the emulated movement (or emulated "coupling change") of the tag emulation device relative to the reader device can cause a change in the impedance of an antenna and matching network system of the reader device. In some embodiments, this change in the impedance of the antenna and matching network system of the reader device can be detected by the reader device by monitoring a signal (such as a voltage) of the receiver unit of the reader device. In other embodiments, this change in the impedance of the antenna and matching network system of the reader device can be detected by the reader device by monitoring a signal of the transmitter unit of the reader device, or by monitoring a phase difference between a transmitter signal and a receiver signal of the reader device.

The present invention provides for a method for emulating a tag device that communicates via inductive coupling, the method comprising: (a) generating, by a transmitter unit of a reader device that communicates via inductive coupling, a transmitted field; (b) receiving, by a tag emulation device, the transmitted field, wherein the tag emulation device emulates coupling change of the tag emulation device relative to the reader device by changing configuration parameters of the tag emulation device and by not moving the tag emulation device relative to the reader device; (c) detecting, by the reader device, an impedance change of an antenna and matching network system of the reader device, wherein the impedance change corresponds to an emulated coupling change of the tag emulation device relative to the reader device.

In some embodiments, the coupling change corresponds to movement of the tag emulation device relative to the reader device.

In some embodiments, the coupling change corresponds to changing one of the following: (i) a position of the tag emulation device relative to the reader device, (ii) an orientation of the tag emulation device relative to the reader device, (iii) an antenna size of the tag emulation device and/or an antenna size of the reader device.

In some embodiments, changing the position comprises one or more of the following: (1) changing a distance of the tag emulation device relative to the reader device, (2) changing an offset position of the tag emulation device relative to the reader device while keeping the distance fixed.

In some embodiments, the method further comprising: (d) using the tag emulation device for one or more of the following: (i) testing the reader device, (ii) validating the reader device, (iii) calibrating the reader device, (iv) characterizing the reader device.

In some embodiments, the reader device is further comprised of a receiver unit, wherein the impedance change is detected by monitoring a voltage of the receiver unit.

In some embodiments, the reader device is further comprised of a receiver unit, wherein the impedance change is detected by monitoring a signal of the receiver unit, wherein the signal is comprised of one or more of the following: (i) a voltage, (ii) a current, (iii) a power.

In some embodiments, the impedance change is detected by monitoring a signal of the transmitter unit, wherein the signal is comprised of one or more of the following: (i) a current, (ii) a voltage, (iii) a power.

In some embodiments, the reader device is further comprised of a receiver unit, wherein the impedance change is detected by monitoring a phase difference between a signal transmitted by the transmitter unit of the reader device and a signal received by the receiver unit of the reader device.

In some embodiments, the tag emulation device is comprised of: (i) a transmitter (Tx) unit, wherein the transmitter (Tx) unit is comprised of at least one Tx driver, (ii) a receiver (Rx) unit, wherein the receiver (Rx) unit is comprised of a HF (high frequency) attenuator, (iii) a matching network.

In some embodiments, the tag emulation device emulates coupling change of the tag emulation device relative to the reader device by changing one or more of the following configuration parameters of the tag emulation device: (1) changing a Tx voltage, (2) changing a Tx driver impedance, (3) changing a HF attenuator resistance, (4) changing a Tx output modulation, (5) changing a matching network tuning, (6) changing a phase of a Tx signal versus a carrier signal of the transmitted field from the reader device, (7) enabling one or two Tx drivers.

In some embodiments, the tag emulation device is a NFC-enabled device in card mode, wherein NFC stands for Near Field Communication, wherein the tag emulation device is a NFC-enabled device in one of the following modes: (i) ALM (active load modulation) card mode, (ii) PLM (passive load modulation) card mode.

In some embodiments, testing of the reader device is conducted using one of the following testing techniques: (i) over-the-air (OTA) testing, (ii) conducted testing.

The present invention provides for a computer program product comprising executable instructions encoded in a non-transitory computer readable medium which, when executed by a tag emulation device, carry out or control a method for emulating a tag device that communicates via inductive coupling, the method comprising: (a) generating, by a transmitter unit of a reader device that communicates via inductive coupling, a transmitted field; (b) receiving, by a tag emulation device, the transmitted field, wherein the tag emulation device emulates coupling change of the tag emulation device relative to the reader device by changing configuration parameters of the tag emulation device and by not moving the tag emulation device relative to the reader device; (c) detecting, by the reader device, an impedance change of an antenna and matching network system of the reader device, wherein the impedance change corresponds to an emulated coupling change of the tag emulation device relative to the reader device.

The present invention provides for a tag emulation device that communicates via inductive coupling, the tag emulation device comprising: (a) a receiver (Rx) unit, the receiver (Rx) unit configured to receive a transmitted field from a reader device; (b) a matching network, the matching network configured to couple the receiver unit to an antenna; (c) an emulation control unit, the emulation control unit configured to emulate coupling change of the tag emulation device relative to the reader device by changing configuration parameters of the tag emulation device and by not moving the tag emulation device relative to the reader device.

In some device embodiments, the coupling change corresponds to movement of the tag emulation device relative to the reader device.

In some device embodiments, the coupling change corresponds to changing one of the following: (i) a position of the tag emulation device relative to the reader device, (ii) an orientation of the tag emulation device relative to the reader device, (iii) an antenna size of the tag emulation device and/or an antenna size of the reader device.

In some device embodiments, the tag emulation device further comprising: (d) a transmitter (Tx) unit, wherein the matching network is further configured to couple the transmitter unit to the antenna.

In some device embodiments, the transmitter (Tx) unit of the tag emulation device is comprised of at least one Tx driver, wherein the receiver (Rx) unit of the tag emulation device is comprised of a HF (high frequency) attenuator, wherein the tag emulation device emulates coupling change of the tag emulation device relative to the reader device by changing one or more the following configuration parameters of the tag emulation device: (i) changing a Tx voltage, (ii) changing a Tx driver impedance, (iii) changing a HF attenuator resistance, (iv) changing a Tx output modulation, (v) changing a matching network tuning, (vi) changing a phase of a Tx signal versus a carrier signal of the transmitted field from the reader device, (vii) enabling one or two Tx drivers.

In some device embodiments, NFC stands for Near Field Communication, wherein the tag emulation device is a NFC-enabled device in one of the following modes: (i) ALM (active load modulation) card mode, (ii) PLM (passive load modulation) card mode.

The above summary is not intended to represent every example embodiment within the scope of the current or future Claim sets. Additional example embodiments are discussed within the Figures and Detailed Description below. Other aspects and advantages of embodiments of the present invention will become apparent from the following detailed description taken in conjunction with the accompanying drawings.

DETAILED DESCRIPTION

Figure 1:
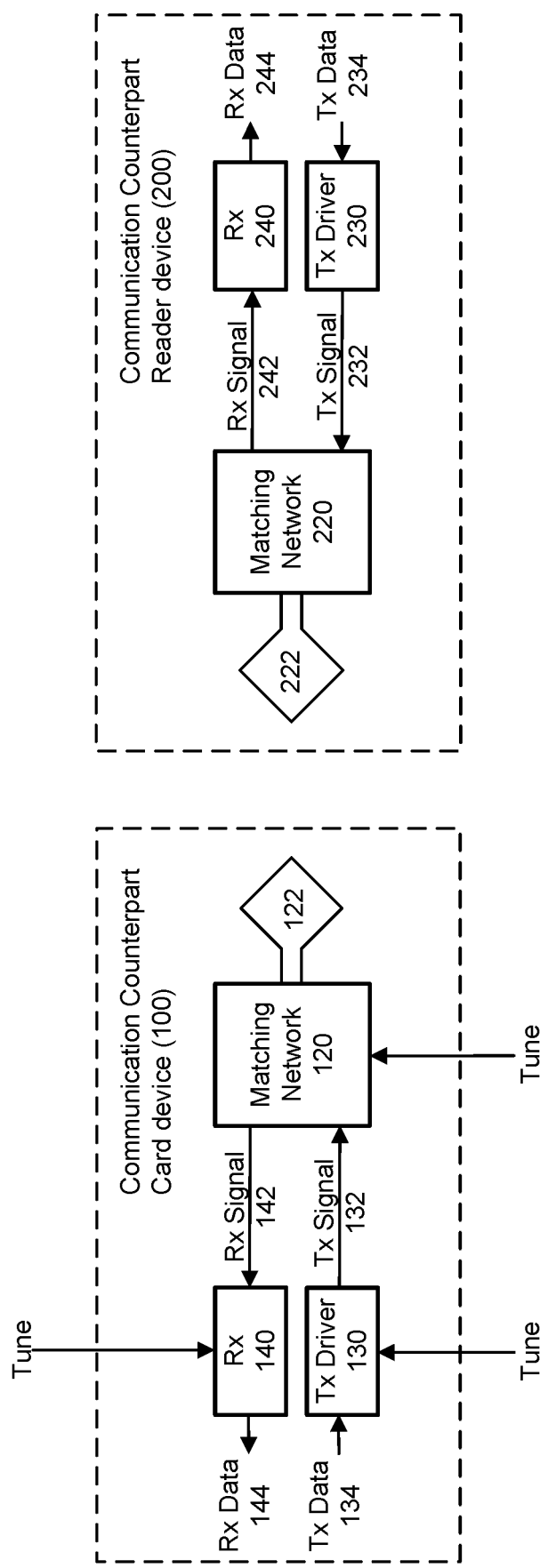
FIG. 1 shows a functional block diagram of a card/reader communication system with a card device (i.e., an "emulation tester") (on the left) and a reader device (i.e., a DUT or "device under test") (on the right), in accordance with some embodiments of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

This specification discloses methods and devices for emulating a tag device that communicates via inductive coupling, such as a NFC (Near Field Communication) tag device. In some embodiments, this specification discloses methods and devices to use this tag device "emulation" for testing, validating, calibrating, and characterizing a reader device.

As an example, it is an important feature for a reader device to be able to detect that a tag device is within communication distance. In some embodiments, this is a feature for low-power card detection, where a reader device can detect the proximity of a tag in a very low power manner (e.g., without doing a full communication on the protocol level). This low-power card detection function basically detects the detuning and can be used with a low-power card detector (LPCD).

In order to achieve low power and high sensitivity for low-power card detection, several techniques can be used.

To achieve low power, duty cycling can be used (to save power), by having only a fraction of one period in which the LPCD signal or system is active (where a duty cycle or power cycle is the fraction of one period in which a signal or system is active). In some embodiments, an additional "hybrid mode" can also be added. This additional "hybrid mode" is operated at a second clock frequency (with a corresponding second time period), which is lower than a first clock frequency (with a corresponding first time period) used for the duty cycle. In this "hybrid mode", a full polling loop is done after each second time period to cover also tags that are not detected by LPCD. This "hybrid mode" second time period would, of course, be longer than the first time period associated with the normal duty cycle.

To achieve high sensitivity, detection of detuning can be performed by measurement of: (a) receiver (Rx) voltage of a reader device, (b) transmitter (Tx) current of a reader device, (c) phase of a reader device, or (d) any combination of the Rx voltage, Tx current, and phase.

In some embodiments, detection of detuning can be performed by measurement of: (a) receiver (Rx) voltage of a reader device. In some embodiments, the Rx voltage of the reader device can be measured, while a tag device is being moved closer to the reader device.

In some embodiments, detection of detuning can be performed by measurement of: (b) transmitter (Tx) current of a reader device. In some embodiments, the Tx current of the reader device can be measured, while a tag device is being moved closer to the reader device.

In some embodiments, detection of detuning can be performed by measurement of: (c) phase of a reader device. In some embodiments, a phase between the Rx and Tx signal of the reader device is measured. In some embodiments, the phase can be measured, while a tag device is being moved closer to the reader device.

Regardless of the implemented LPCD method, there is a need for efficient mass testing of the LPCD method for a RF reader/tag system. In particular, there are demands for an efficient, accurate and repeatable system and method for production test (customer environment), validation, and calibration of the LPCD. However, the obvious testing method—which is to use and move a tag (or card) device from a far-distance to a close-distance relative to the DUT (device under test) until the tag/card device is detected—is neither fast, nor accurate, nor repeatable without tremendous effort. Such customer production test lines may employ hundreds of test stations in parallel (which would demand for a huge number of robots to have controlled test conditions), even though a fast test cycle based on robot movements may not even be possible.

Therefore, there are strong needs for systems and methods that can emulate moving the tag device, without actually moving the tag device. There are also strong needs for systems and methods that can emulate other aspects of the LPCD method for a RF reader/tag system, whereby such aspects include changing orientation of a tag device relative to a reader device, or changing an antenna size of a tag device and/or an antenna size of a reader device.

From some points of view, movement of a tag device relative to a reader device can be considered to be a "coupling change" of the tag device relative to the reader device. Therefore, in general, it is desirable to emulate "coupling change" of a tag device relative to a reader device by not having to move the tag device relative to the reader device. Accordingly, in some embodiments, such emulation of a tag device can be achieved by changing configuration parameters of a tag emulation device and by not having to move the tag emulation device relative to the reader device.

Figure 2:
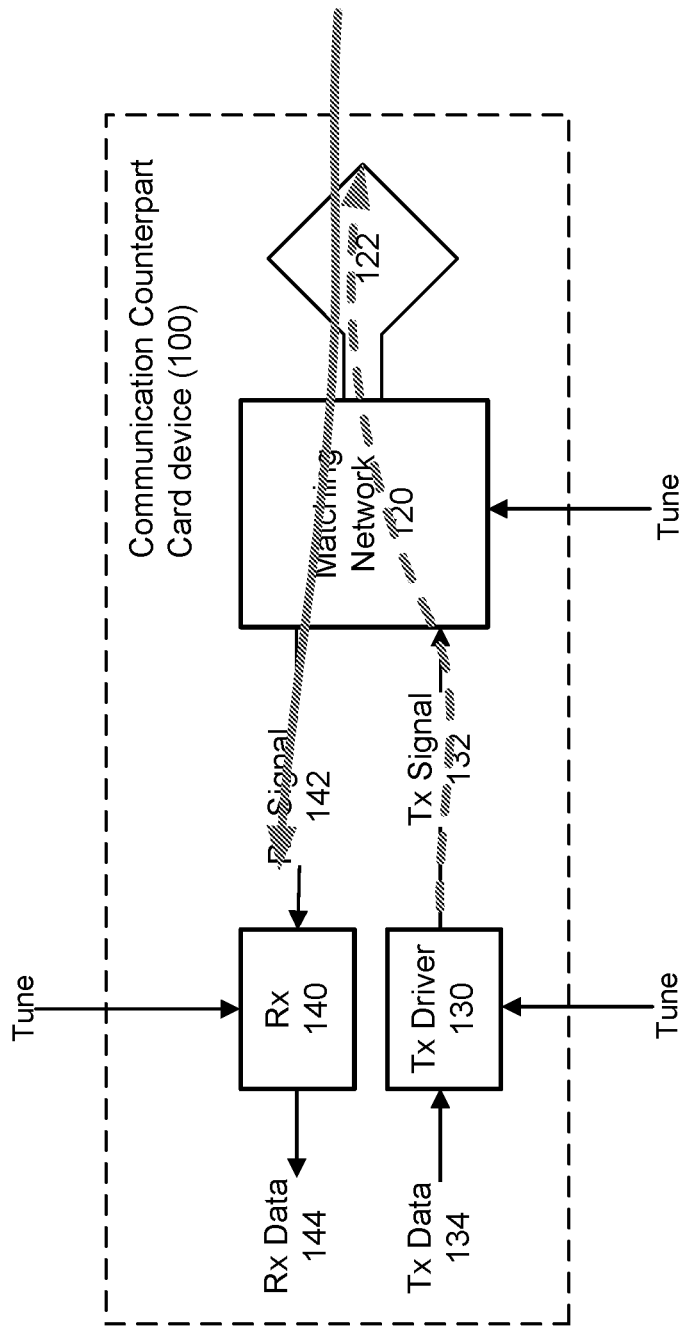
FIG. 2 shows a functional block diagram of a card device used as an "active tag emulator" (i.e., "emulation tester"), where the RF (radio frequency) carrier generated by a reader DUT (device under test) and received by the "emulation tester" card device is shown in 'solid' line, and the ALM signal transfer from the "emulation tester" card device to the reader DUT is shown in 'dash' line, in accordance with some embodiments of the invention.

An important embodiment of this invention is to use a NFC card/tag device 100 in ALM (active load modulation) as an "active tag emulator" (or as an "emulation tester" card device) as shown in FIG. 1, which is actively "detuning" the reader/card communication system (as shown in FIG. 1) by sending a RF carrier. FIG. 2 shows that, for the "active tag emulator" 100 (or the "emulation tester" card device 100) of FIG. 1, the RF (radio frequency) carrier generated by the reader DUT (device under test) and received by the "emulation tester" card device is shown in 'solid' line, and the ALM signal transfer from the "emulation tester" card device to the reader DUT is shown in 'dash' line. As an example, the transmitter (Tx) driver can be generating a RF signal with the carrier frequency of 13.56 MHz according to NFC/RFID specification.

Even though the embodiment shown in FIG. 1 depicts a NFC card/tag device 100 in ALM (active load modulation) as an "emulation tester" card device, it should be noted that, in other embodiments, the card/tag device 100 can also be in PLM (passive load modulation) as an "emulation tester" card device. In those embodiments, the card/tag device 100 can be without a transmitter.

FIG. 1 shows a functional block diagram of a card/reader communication system with a card device 100 (i.e., an "emulation tester") (on the left) and a reader device 200 (i.e., a DUT or "device under test") (on the right), in accordance with some embodiments of the invention.

FIG. 1 shows a DUT reader device 200 on the right. In FIG. 1, the DUT reader device 200 is shown to include a Tx (transmitter) driver 230, a Rx (receiver) 240, a matching network 220, and an antenna 222. In general, a reader device can include a Tx (transmitter) unit (which can further include a Tx driver, Tx supply, etc.), a Rx (receiver) unit, a matching network, and an antenna. FIG. 1 shows that the Tx driver 230 receives Tx data 234 as input, and then transmits Tx signal 232 as output. FIG. 1 also shows that the Rx 240 receives Rx signal 242 as input, and then transmits Rx data 244 as output.

FIG. 1 also shows an "emulation tester" card device 100 on the left. In FIG. 1, the "emulation tester" card device 100 is shown to include a Tx (transmitter) driver 130, a Rx (receiver) 140, a matching network 120, and an antenna 122. In general, a card device can include a Tx (transmitter) unit (which can further include a Tx driver, Tx supply, etc.), a Rx (receiver) unit, a matching network, and an antenna. FIG. 1 shows that the Tx driver 130 receives Tx data 134 as input, and then transmits Tx signal 132 as output. FIG. 1 also shows that the Rx 140 receives Rx signal 142 as input, and then transmits Rx data 144 as output. FIG. 1 further shows that the "emulation tester" card device 100 can emulate the movement (or, in general, the "coupling change") of the "emulation tester" card device 100 relative to the reader device by tuning the receiver (Rx) 140, the transmitter (Tx) 130, and the matching network 120. In some embodiments, this emulation can be performed by not actually moving the "emulation tester" card device relative to the reader device. In some embodiments, this emulation can be performed by tuning the configuration parameters of the Rx 140, the Tx 130, and the matching network 120.

In some embodiments, this emulation can be performed by tuning one or more of the following configuration parameters of the "emulation tester" card device 100: (1) changing a Tx (transmitter) voltage, (2) changing a Tx driver (130) impedance, (3) changing a HF (high frequency) attenuator resistance, (4) changing a Tx output modulation, (5) changing a matching network (120) tuning, (6) changing a phase of a Tx signal versus a carrier signal of the transmitted field from the reader device, (7) enabling one or two Tx drivers. In turn, the emulated movement (or the emulated "coupling change") of the "emulation tester" card device 100 relative to the DUT reader device 200 can cause a change in the impedance of an antenna and matching network system (222, 220) of the DUT reader device 200. In some embodiments, this change in the impedance of the antenna and matching network system (222, 220) of the DUT reader device 200 can be detected by the DUT reader device 200 by monitoring a signal (such as a voltage) of the receiver unit 240 of the DUT reader device 200. In other embodiments, this change in the impedance of the antenna and matching network system (222, 220) of the DUT reader device 200 can be detected by the DUT reader device 200 by monitoring a signal of the transmitter unit of the DUT reader device 200, or by monitoring a phase difference between a transmitter signal and a receiver signal of the DUT reader device 200.

Looking at FIG. 1, it can be seen that the "emulation tester" card device 100 on the left is very similar to the DUT reader device 200 on the right, since they both include a transmitter (Tx), a receiver (Rx), a matching network, and an antenna. In fact, in some embodiments, another DUT (device under test) reader device can be configured to become an "emulation tester" card device. In other words, in some embodiments, this invention can test, validate, and calibrate a card-detection mechanism/unit of a DUT reader device by using another DUT's capabilities to "emulate a tag".

FIG. 2 shows details of the "emulation tester" card device 100 from FIG. 1. The "emulation tester" card device 100 is a NFC-enabled device in card-mode with ALM (active load modulation). Therefore, FIG. 2 shows a functional block diagram of a card device 100 used as an "active tag emulator" (i.e., "emulation tester"), where the RF (radio frequency) carrier generated by the reader DUT (device under test) 200 and received by the "emulation tester" card device 100 is shown in 'solid' line, and the ALM signal transfer from the "emulation tester" card device 100 to the reader DUT 200 is shown in 'dash' line, in accordance with some embodiments of the invention.

In summary, this specification discloses methods and devices for emulating the movement (or, in general, the "coupling change") of the tag/card device relative to a reader device, by not actually moving the tag/card device relative to a reader device, and by influencing the system behavior by actively changing the parameters of the tag/card device. In turn, this emulation can be used for testing and calibration of any features of a reader device that are associated with the movement (or, in general, the "coupling change") of the tag/card device relative to a reader device. An example of one such feature is the low-power card detector (LPCD), which is used for detecting that the tag/card device is within communication distance of the reader device.

In further summary, such a LPCD test is important for the following reasons:

(1) This is a highly flexible test of the LPCD (e.g., using Tx, Rx, and/or matching network).

(2) There is no need for geometric movement of the tag, which means no need for mechanical robots.

(3) Change of absolute levels is possible by just reconfiguration of the "emulation tester" card/tag device, which for example can be a NFC-enabled device in card-mode. For the NFC-enabled device in card-mode, both ALM (active load modulation) and PLM (passive load modulation) can be used.

(4) There is testing capability with high resolution to check the sensitivity.

(5) This is a highly repeatable test sequence.

(6) This is an efficient and self-contained procedure without need of external equipment.

(7) This is a fast method, since there is no need for a mechanical robot to move a card/tag device and no need to control external measurement equipment.

Figure 3:
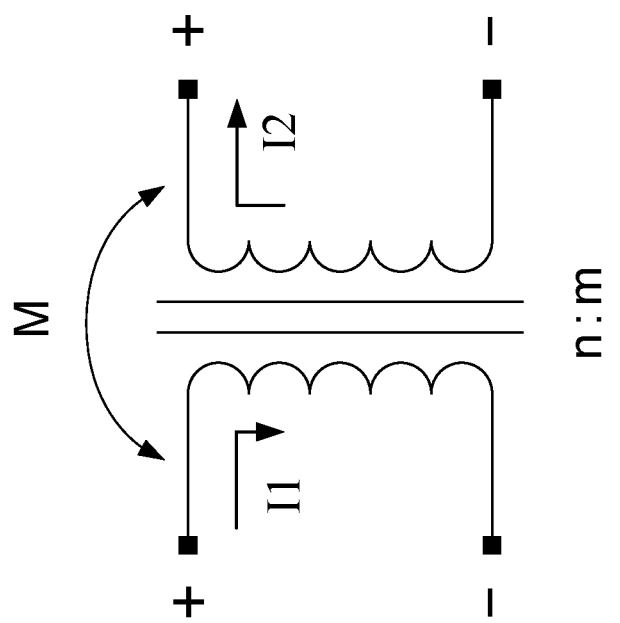
FIG. 3 shows a transformer build of two inductors with a specific mutual inductor M depending on its coupling, in accordance with some embodiments of the invention.
Figure 4:
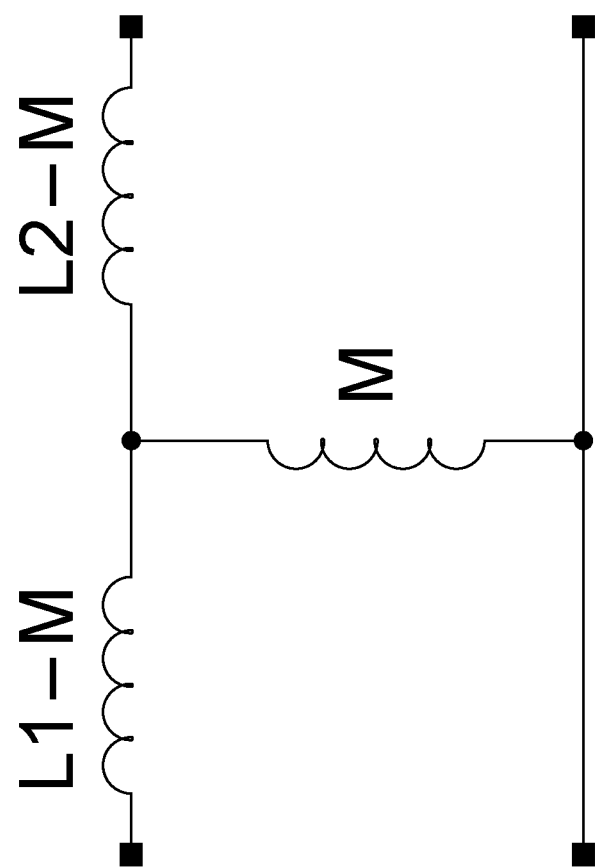
FIG. 4 shows an equivalent circuit of a transformer, in accordance with some embodiments of the invention.

FIGS. 3 and 4 can further explain how the impedance change of an antenna and matching network system of the reader device can correspond to an emulated movement (or, in general, an emulated "coupling change") of the "emulation tester" card device relative to the reader device.

An important point of this invention is that the coupling system of both antennas (which are coils (or inductors) "connected" by sharing the same magnetic field) can be seen as a transformer. In turn, any change of load impedance on the secondary side (i.e., the tag/card device) has an impact on the load impedance on the primary side (i.e., the reader device) of the transformer.

This shown in FIG. 3, which depicts a transformer build of two inductors with a specific mutual inductor M depending on its coupling, in accordance with some embodiments of the invention. In FIG. 3, M represents the mutual inductance. L1 and I1 represents the inductance of coil 1 and the current in coil 1, where coil 1 is the primary coil (or primary inductor). L2 and I2 represents the inductance of coil 2 and the current in coil 2, where coil 2 is the secondary coil (or secondary inductor). The label "n:m" represents the ratio between the number of windings of the left inductor to windings of the right inductor.

The equation for V1, the voltage across coil 1 (or the primary coil) is given by:

$$V1 = L1\, d/dt(I1) - M\, d/dt(I2)$$

where the mutual inductance M is given by the equation:

$$M = k\, \mathrm{sqrt}(L1 L2)$$

Here, the coupling k is dependent on the geometry, size, distance, rotation of the two antennas.

FIG. 4 shows an equivalent circuit of a transformer, in accordance with some embodiments of the invention. As shown in FIG. 4, the channel (both antennas and the coupling in between) can be represented as an equivalent system of inductors.

Based on the system of FIG. 4, if there is any active or passive "behavior" on one port, then there is an impact on the other port of the system.

In a real system, due to the movement of the tag/card device, the coupling k changes. Then, in turn, M also changes, resulting in a change of impedance on port 1. As a result, if there is a signal on port 1, then the current/voltage into port 1 will also change.

With lower distance, k gets lower, and M also gets lower.

Furthermore, Z1 can be expressed as a function of Z2, M, L1, and L2. Or, in other words, Z1 is dependent on Z2, M, L1, and L2.

In the proposed method, k is constant (because there is no change in distance). Consequently, M is constant as well. However, on port two, the system is changed passively by modifying Z2, which has impact on Z1, which is used for detection. On port two, the system is also changed actively, by replacing or extending the impedance of Z2 by an active circuitry (e.g. voltage or current source). In turn, any change of the system on port 2, Z2 or the active circuitry, will impact the signal (voltage, current, impedance) on port 1.

As an example, methods for changing the system on port 2 (i.e., the tag/card emulator device) can be changing the following parameters of the tag/card emulator device: (1) the transmitter (Tx) voltage, (2) the transmitter (Tx) driver impedance, (3) the HF (high frequency) attenuator resistance, (4) the transmitter (Tx) output modulation (PWM), (5) the matching network tuning (e.g., varactors), (6) the phase of the transmitter (Tx) signal versus the carrier signal (which is transmitted from the reader device), (7) enabling one or two transmitter (Tx) drivers. These parameters of the tag/card emulator device can, in turn, be changed independently (i.e., change only one of the parameters), or combined (i.e., change more than one of the parameters).

Figure 5:
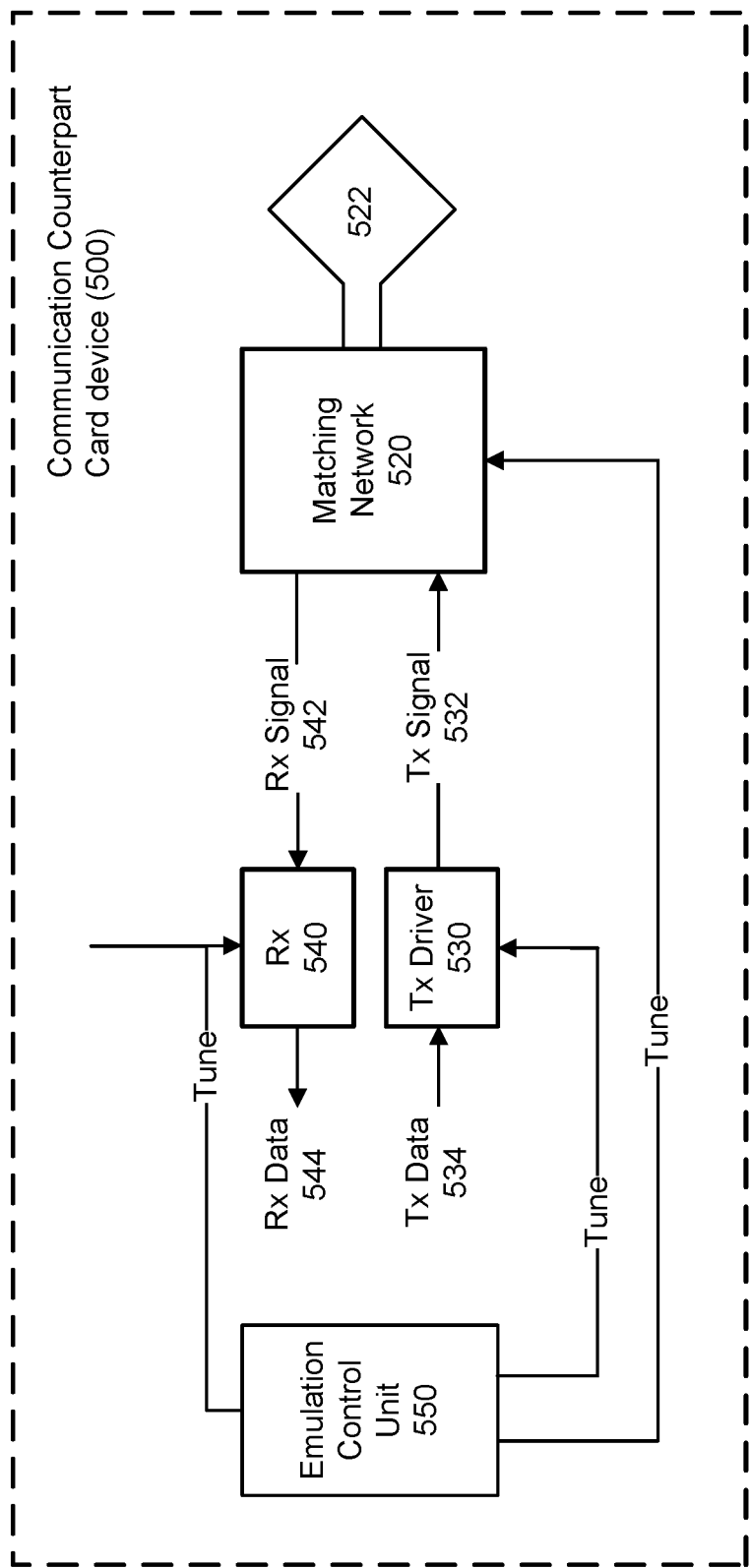
FIG. 5 shows a functional block diagram of an "emulation tester" card device (which is a part of a loopback-based test/calibration system) with an emulation control unit, a receiver (Rx), a transmitter (Tx), a matching network, and an antenna, in accordance with some embodiments of the invention.

FIG. 5 shows an example tag/card device to use for performing the previously described method for emulating the movement (or, in general, the "coupling change") of the tag/card device relative to a reader device, by not actually moving the tag/card device relative to a reader device, and by influencing the system behavior by actively changing the parameters of the tag/card. In particular, FIG. 5 shows a functional block diagram of an "emulation tester" card device 500 (which is a part of a loopback-based test/calibration system) with an emulation control unit 550, a receiver (Rx) 540, a transmitter (Tx), a matching network 520, and an antenna 522, in accordance with some embodiments of the invention.

In FIG. 5, the "emulation tester" card device 500 is shown to include an emulation control unit 550, a Rx (receiver) 540, a Tx (transmitter) driver 530, a matching network 520, and an antenna 522. In general, a card device can include a Tx (transmitter) unit (which can further include a Tx driver, Tx supply, etc.), a Rx (receiver) unit, a matching network, and an antenna. FIG. 5 shows that the Tx driver 530 receives Tx data 534 as input, and then transmits Tx signal 532 as output. FIG. 5 also shows that the Rx 540 receives Rx signal 542 as input, and then transmits Rx data 544 as output. FIG. 5 further shows that the "emulation tester" card device 100 can emulate the movement (or, in general, the "coupling change") of the "emulation tester" card device 500 relative to a reader device by using the emulation control unit 550 to tune the receiver (Rx) 540, the transmitter (Tx) 530, and the matching network 520. In some embodiments, this emulation can be performed by not actually moving the "emulation tester" card device relative to the reader device.

As described previously, the "emulation tester" tag/card device 500 can emulate movement (or, in general, "coupling change") of the "emulation tester" tag/card device 500 relative to a reader device by changing one or more of the following configuration parameters of the "emulation tester" tag/card device 500: (1) changing a Tx (transmitter) voltage, (2) changing a Tx driver impedance, (3) changing a HF (high frequency) attenuator resistance, (4) changing a Tx output modulation, (5) changing a matching network tuning, (6) changing a phase of a Tx signal versus a carrier signal of the transmitted field from the reader device, (7) enabling one or two Tx drivers. In turn, the emulated movement (or the emulated "coupling change") of the tag emulation device relative to the reader device can cause a change in the impedance of an antenna and matching network system of the reader device. In some embodiments, this change in the impedance of the antenna and matching network system of the reader device can be detected by the reader device by monitoring a signal (such as a voltage) of the receiver unit of the reader device. In other embodiments, this change in the impedance of the antenna and matching network system of the reader device can be detected by the reader device by monitoring a signal of the transmitter unit of the reader device, or by monitoring a phase difference between a transmitter signal and a receiver signal of the reader device.

In FIG. 5, the emulation control unit 550 can be a hardware and/or software unit that emulates movement (or, in general, "coupling change") of the "emulation tester" tag/card device 500 relative to a reader device by tuning the receiver (Rx) 540, the transmitter (Tx) 530, and the matching network 520. In some embodiments, the emulation control unit 550 can be one of the following: (a) a hardware functional block, (b) a software functional block, (c) a functional block comprising both hardware and software.

Figure 6:
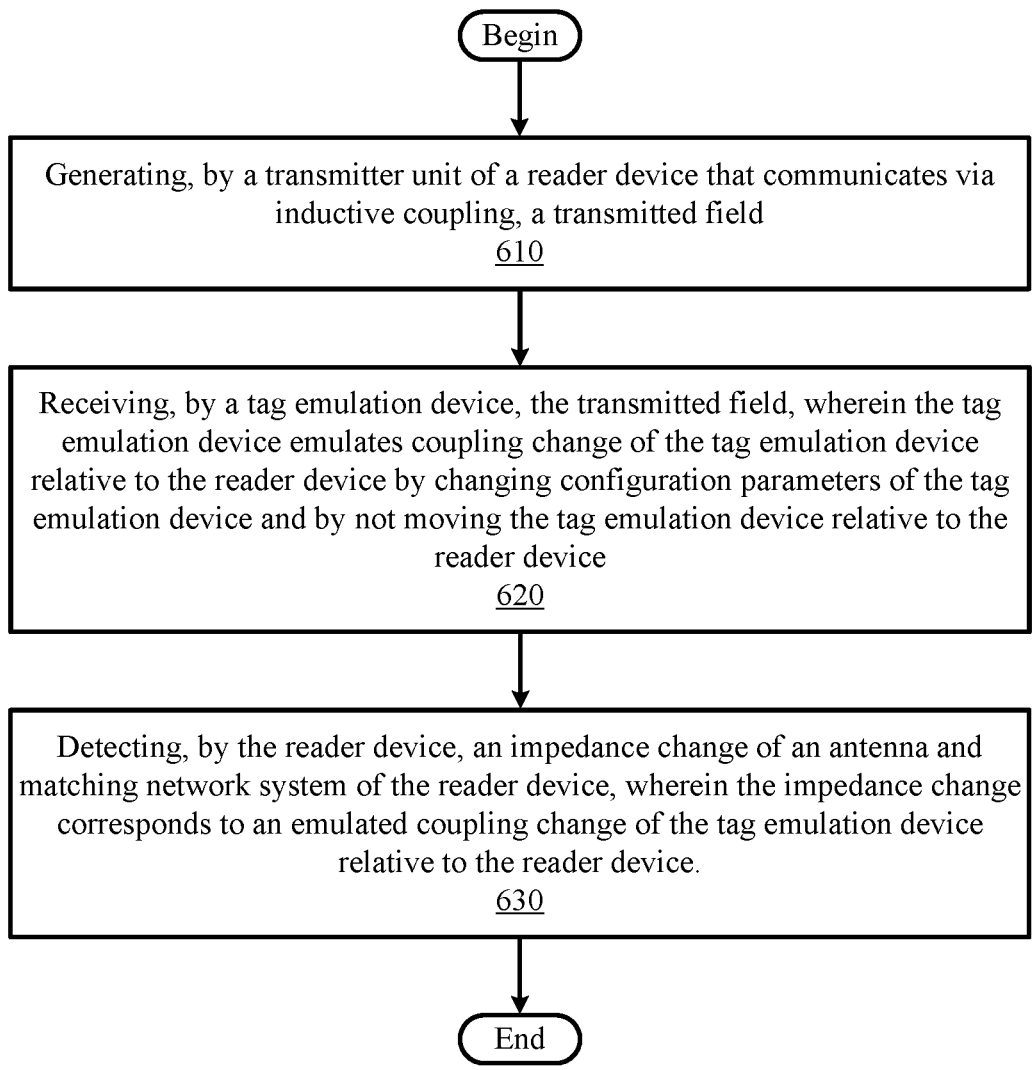
FIG. 6 shows a process flow diagram of a method for emulating a tag device that communicates via inductive coupling, in accordance with some embodiments of the invention.

FIG. 6 shows a process flow diagram of a method for emulating a tag device that communicates via inductive coupling, in accordance with some embodiments of the invention. As shown in FIG. 6, the method 600 begins at step 610, where the method generates, by a transmitter unit of a reader device that communicates via inductive coupling, a transmitted field. Next, at step 620, the method receives, by a tag emulation device, the transmitted field, wherein the tag emulation device emulates coupling change of the tag emulation device relative to the reader device by changing configuration parameters of the tag emulation device and by not moving the tag emulation device relative to the reader device. Finally, at step 630, the method detects, by the reader device, an impedance change of an antenna and matching network system of the reader device, wherein the impedance change corresponds to an emulated coupling change of the tag emulation device relative to the reader device.

In some embodiments, the present invention provides for a computer program product comprising executable instructions encoded in a non-transitory computer readable medium which, when executed by a tag emulation device, carry out or control method 600 (of FIG. 6) for emulating a tag device that communicates via inductive coupling. In some embodiments, various aspects of the described method 600 can be implemented by software, hardware or a combination of hardware and software. Similarly, various aspects of other described method embodiments in this specification can also be implemented by software, hardware or a combination of hardware and software.

In some embodiments, the coupling change can correspond to changing one of the following: (i) a position of the tag emulation device relative to the reader device, (ii) an orientation of the tag emulation device relative to the reader device, (iii) an antenna size of the tag emulation device and/or an antenna size of the reader device. With regards to changing a position of the tag emulation device relative to the reader device, in some embodiments, this can be simply changing a distance of the tag emulation device relative to the reader device, which would be the same as moving the tag emulation device relative to the reader device. In other embodiments involving changing a position, this can be changing an offset position of the tag emulation device relative to the reader device while keeping the distance fixed. In this case, the distance can be kept fixed, while the tag emulation device move to a different position, which might change the orientation of the antennas with respect to each other. With regards to changing an orientation of the tag emulation device relative to the reader device, in some embodiments, this can be changing a tilt angle of an antenna.

In some embodiments, the method further comprising: (d) using the tag emulation device for one or more of the following: (i) testing the reader device, (ii) validating the reader device, (iii) calibrating the reader device, (iv) characterizing the reader device.

In some embodiments, testing can be production testing, which can include, for example, a pass/fail test under limited conditions. In other embodiments, testing can be regression testing, which can include, for example, doing a new firmware version testing. For the new firmware version testing, the test plan can be to carry out a large number of testing conditions (i.e., pre-defined set of test conditions) on one sample, so that the testing can demonstrate that there is no drop-off in performance of the new firmware version for the production testing. In some embodiments, calibrating can be performing a tuning on a parameter, so that all the devices will behave in a same way. In some embodiments, characterizing can be testing over all parameters, such as temperature and all position geometries.

In some embodiments, testing of the reader device can be conducted using one of the following testing techniques: (i) over-the-air (OTA) testing, (ii) conducted testing. In some embodiments, (i) over-the-air (OTA) testing can mean use of wireless communication for testing. In some embodiments, (ii) conducted testing can mean replacing the OTA path with a conducted coupling path (e.g., using a capacitor and replacing the antennas).

In some embodiments, the reader device is further comprised of a receiver unit, wherein the impedance change is detected by monitoring a signal of the receiver (Rx) unit, wherein the signal is comprised of one or more of the following: (i) a voltage, (ii) a current, (iii) a power. Here, the impedance change can correspond to an emulated movement (or an emulated "coupling change") of the tag emulation device relative to the reader device, and this impedance change can be detected by monitoring a Rx voltage, a Rx current, a Rx power, or any combination of these three parameters. In some embodiments, the preferred embodiment can be a Rx voltage, because the Rx is current driven.

In some embodiments, the impedance change is detected by monitoring a signal of the transmitter (Tx) unit, wherein the signal is comprised of one or more of the following: (i) a current, (ii) a voltage, (iii) a power. Here, the impedance change (corresponding to an emulated movement (or an emulated "coupling change") of the tag emulation device relative to the reader device) can be detected by monitoring a Tx voltage, a Tx current, a Tx power, or any combination of these three parameters. In some embodiments, the preferred embodiment can be a Tx current, because the Tx is voltage driven.

In some embodiments, the tag emulation device emulates coupling change of the tag emulation device relative to the reader device by changing one or more of the following configuration parameters of the tag emulation device: (1) changing a Tx voltage, (2) changing a Tx driver impedance, (3) changing a HF attenuator resistance, (4) changing a Tx output modulation, (5) changing a matching network tuning, (6) changing a phase of a Tx signal versus a carrier signal of the transmitted field from the reader device, (7) enabling one or two Tx drivers. With regards to (4) changing a Tx output modulation, in some embodiments, this can involve changing the Tx output modulation, which is PWM (pulse width modulation). In some embodiments, this can mean scaling the Tx pulse width. With regards to (5) changing a matching network tuning, in some embodiments, this can involve changing varactors associated with the matching network tuning. With regards to (6) changing a phase of a Tx signal versus a carrier signal of the transmitted field from the reader device, in some embodiments, this can involve changing the ALM initial phase.

In some embodiments, the tag emulation device is a NFC-enabled device in card mode, wherein the tag emulation device is a NFC-enabled device in one of the following modes: (i) ALM (active load modulation) card mode, (ii) PLM (passive load modulation) card mode. Here, an antenna in a portal device, such as a smartphone, can be small due to form factor and space constraints. Such a small antenna can make the signal very weak. Therefore, for testing and calibrating purposes, one can select to use a larger antenna to boost the signal strength.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Examples of optical discs include a compact disc with read only memory (CD-ROM), a compact disc with read/write (CD-R/W), a digital video disc (DVD), and a Blu-ray disc.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for emulating a tag device that communicates via inductive coupling, the method comprising:
    generating, by a transmitter unit of a reader device that communicates via inductive coupling, a transmitted field;
    receiving, by a tag emulation device, the transmitted field, wherein the tag emulation device emulates coupling change of the tag emulation device relative to the reader device by changing configuration parameters of the tag emulation device and by not moving the tag emulation device relative to the reader device, wherein changing configuration parameters includes changing a phase of a transmitted signal from the tag emulation device versus a phase of a carrier signal of the transmitted field from the reader device;
    detecting, by the reader device, an impedance change of an antenna and matching network system of the reader device,
    wherein the impedance change corresponds to the emulated coupling change of the tag emulation device relative to the reader device.

2. The method of claim 1, wherein the coupling change corresponds to movement of the tag emulation device relative to the reader device.

3. The method of claim 1, wherein the coupling change corresponds to changing one of the following:
    a position of the tag emulation device relative to the reader device,
    an orientation of the tag emulation device relative to the reader device,
    an antenna size of the tag emulation device and/or an antenna size of the reader device.

4. The method of claim 3, wherein changing the position comprises one or more of the following:
    changing a distance of the tag emulation device relative to the reader device,
    changing an offset position of the tag emulation device relative to the reader device while keeping the distance fixed.

5. The method of claim 1 further comprising:
    using the tag emulation device for one or more of the following:
    testing the reader device,
    validating the reader device,
    calibrating the reader device,
    characterizing the reader device.

6. The method of claim 1, wherein the reader device is further comprised of a receiver unit, wherein the impedance change is detected by monitoring a voltage of the receiver unit.

7. The method of claim 1, wherein the reader device is further comprised of a receiver unit, wherein the impedance change is detected by monitoring a signal of the receiver unit, wherein the signal is comprised of one or more of the following:
- a voltage,
- a current,
- a power.

8. The method of claim 1, wherein the impedance change is detected by monitoring a signal of the transmitter unit, wherein the signal is comprised of one or more of the following:
- a current,
- a voltage,
- a power.

9. The method of claim 1, wherein the reader device is further comprised of a receiver unit, wherein the impedance change is detected by monitoring a phase difference between a signal transmitted by the transmitter unit of the reader device and a signal received by the receiver unit of the reader device.

10. The method of claim 1, wherein the tag emulation device is comprised of:
- a transmitter (Tx) unit, wherein the transmitter (Tx) unit is comprised of at least one Tx driver,
- a receiver (Rx) unit, wherein the receiver (Rx) unit is comprised of a HF (high frequency) attenuator,
- a matching network.

11. The method of claim 10, wherein the tag emulation device emulates coupling change of the tag emulation device relative to the reader device by changing one or more the following configuration parameters of the tag emulation device:
- changing a Tx voltage,
- changing a Tx driver impedance,
- changing a HF attenuator resistance,
- changing a Tx output modulation,
- changing a matching network tuning,
- enabling one or two Tx drivers.

12. The method of claim 1, wherein the tag emulation device is a NFC-enabled device in card mode, wherein NFC stands for Near Field Communication, wherein the tag emulation device is a NFC-enabled device in one of the following modes:
- ALM (active load modulation) card mode,
- PLM (passive load modulation) card mode.

13. The method of claim 5, wherein testing of the reader device is conducted using one of the following testing techniques:
- over-the-air (OTA) testing,
- conducted testing.

14. A computer program product comprising executable instructions encoded in a non-transitory computer readable medium which, when executed by the tag emulation device, carry out or control the method of claim 1.

15. A tag emulation device that communicates via inductive coupling, the tag emulation device comprising:
- a receiver (Rx) unit, the receiver (Rx) unit configured to receive a transmitted field from a reader device;
- a matching network, the matching network configured to couple the receiver unit to an antenna;
- an emulation control unit, the emulation control unit configured to emulate coupling change of the tag emulation device relative to the reader device by changing at least one configuration parameter of the tag emulation device and by not moving the tag emulation device relative to the reader device, wherein the at least one configuration parameter includes changing a phase of a transmitted signal from the tag emulation device versus a phase of a carrier signal of the transmitted field from the reader device, and wherein the emulated coupling change causes an impedance change of an antenna and matching network of the reader device.

16. The tag emulation device of claim 15, wherein the coupling change corresponds to movement of the tag emulation device relative to the reader device.

17. The tag emulation device of claim 15, wherein the coupling change corresponds to changing one of the following:
- a position of the tag emulation device relative to the reader device,
- an orientation of the tag emulation device relative to the reader device,
- an antenna size of the tag emulation device and/or an antenna size of the reader device.

18. The tag emulation device of claim 15 further comprising:
- a transmitter (Tx) unit, wherein the matching network is further configured to couple the transmitter unit to the antenna.

19. The tag emulation device of claim 18,
wherein the transmitter (Tx) unit is comprised of at least one Tx driver,
wherein the receiver (Rx) unit is comprised of a HF (high frequency) attenuator,
wherein the tag emulation device emulates coupling change of the tag emulation device relative to the reader device by changing one or more the following configuration parameters of the tag emulation device:
- changing a Tx voltage,
- changing a Tx driver impedance,
- changing a HF attenuator resistance,
- changing a Tx output modulation,
- changing a matching network tuning,
- enabling one or two Tx drivers.

20. The tag emulation device of claim 15, wherein NFC stands for Near Field Communication, wherein the tag emulation device is a NFC-enabled device in one of the following modes:
- ALM (active load modulation) card mode,
- PLM (passive load modulation) card mode.

* * * * *